(12) United States Patent
Nishimura et al.

(10) Patent No.: US 12,482,271 B2
(45) Date of Patent: Nov. 25, 2025

(54) INFORMATION PROCESSING DEVICE FOR CAPTURING PERIPHERAL IMAGES FROM A VEHICLE-MOUNTED IMAGE CAPTURING UNIT

(71) Applicants: TOYOTA JIDOSHA KABUSHIKI KAISHA, Aichi-ken (JP); NOMURA RESEARCH INSTITUTE, LTD., Tokyo (JP)

(72) Inventors: Kazuya Nishimura, Anjo (JP); Naoki Uenoyama, Kasugai (JP); Keiko Nakano, Kawasaki (JP); Yohei Nakanishi, Nagoya (JP); Takahiro Matsumura, Tokyo (JP)

(73) Assignees: TOYOTA JIDOSHA KABUSHIKI KAISHA, Aichi-ken (JP); NOMURA RESEARCH INSTITUTE, LTD., Tokyo (JP)

( * ) Notice: Subject to any disclaimer, the term of this patent is extended or adjusted under 35 U.S.C. 154(b) by 0 days.

(21) Appl. No.: 18/788,137

(22) Filed: Jul. 30, 2024

(65) Prior Publication Data
US 2025/0054313 A1   Feb. 13, 2025

(30) Foreign Application Priority Data
Aug. 7, 2023   (JP) .................. 2023-128547

(51) Int. Cl.
*G06V 20/56*   (2022.01)

(52) U.S. Cl.
CPC ................... *G06V 20/56* (2022.01)

(58) Field of Classification Search
CPC ........ G06V 20/56; H04N 7/181; H04N 7/188
See application file for complete search history.

(56) References Cited

U.S. PATENT DOCUMENTS

| | | | |
|---|---|---|---|
| 12,164,564 B1 * | 12/2024 | Campbell | G06V 20/588 |
| 2011/0153199 A1 * | 6/2011 | Morimoto | G08G 1/205 |
| | | | 701/533 |
| 2021/0158632 A1 | 5/2021 | Nishiyama et al. | |

FOREIGN PATENT DOCUMENTS

JP   2021-083034 A   5/2021

* cited by examiner

*Primary Examiner* — James M Pontius
(74) *Attorney, Agent, or Firm* — HAUPTMAN HAM, LLP

(57) ABSTRACT

An information processing device includes a processor. In response to an occurrence of at least one of a weather-related event and a natural disaster event, the processor identifies a vehicle located at a site of the event. The processor determines a predetermined condition in accordance with the event. The processor requests the identified vehicle to provide a peripheral image that satisfies the predetermined condition. The peripheral image is generated when an image capturing unit mounted on the identified vehicle captures an image of a periphery of the identified vehicle.

3 Claims, 3 Drawing Sheets

| | Image Capturing Position | | Image Capturing Direction | | Media Type | Video Quality | | | |
|---|---|---|---|---|---|---|---|---|---|
| | Local Road | Highway | Angle of View: Downward | Angle of View: Upward | | Low Resolution /Low Frame Rate | Low Resolution /High Frame Rate | High Resolution /Low Frame Rate | High Resolution /High Frame Rate |
| Weather-Related Event | △ | ○ | × | ○ | Periphery Video Only | × | △ | × | ○ |
| Natural Disaster Event | ○ | △ | ○ | × | Periphery Image Prioritized | △ | × | ○ | × |

| | | Event in Video |
|---|---|---|
| Earthquake | High Seismic Intensity | During Earthquake/After Shaking Stopped |
| | Low Seismic Intensity | During Earthquake |

INFORMATION PROCESSING DEVICE FOR CAPTURING PERIPHERAL IMAGES FROM A VEHICLE-MOUNTED IMAGE CAPTURING UNIT

CROSS-REFERENCE TO RELATED APPLICATIONS

This application is based upon and claims the benefit of priority from prior Japanese Patent Application No. 2023-128547, filed on Aug. 7, 2023, the entire contents of which are incorporated herein by reference.

BACKGROUND

1. Field

The following description relates to an information processing device.

2. Description of Related Art

A vehicle includes an image capturing unit that captures an image of the periphery of the vehicle and generates a peripheral image. The peripheral image shows the environment of the vehicle at the time point at which the image was captured. Japanese Laid-Open Patent Publication No. 2021-83034 discloses a technique that collects peripheral images generated by image capturing units of vehicles at positions and in environments designated by a user, and then provides the collected peripheral images to the user.

When a rare weather-related event, such as a tornado or a falling of a meteorite, or a rare natural disaster event, such as an earthquake or a flood, occurs, a user may want to obtain peripheral images that show such events. However, the peripheral images may not show these events adequately depending on the positions of the vehicles, the specifications, settings, or image capturing directions of the image capturing units, or the like. Although the technique of the patent publication is used to collect peripheral images based on the positions of the vehicles, it is difficult to collect peripheral images that adequately captured certain events.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an information processing device is provided. The information processing device includes a processor. In response to an occurrence of at least one of a weather-related event and a natural disaster event, the processor is configured to identify a vehicle located at a site of the event. The processor is configured to determine a predetermined condition in accordance with the event. The processor is configured to request the identified vehicle to provide a peripheral image that satisfies the predetermined condition. The peripheral image is generated when an image capturing unit mounted on the identified vehicle captures an image of a periphery of the identified vehicle. The processor is configured to receive the requested peripheral image from the identified vehicle via a communication network.

Other features and aspects will be apparent from the following detailed description, the drawings, and the claims.

BRIEF DESCRIPTION OF THE DRAWINGS

FIG. 3 is a diagram illustrating an example of the content of first predetermined-condition information.

FIG. 4 is a diagram illustrating an example of the content of second predetermined-condition information.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Embodiment

An embodiment of an information processing device will now be described with reference to FIGS. 1 to 6.
Configuration of Information Processing System 1

Figure 1:
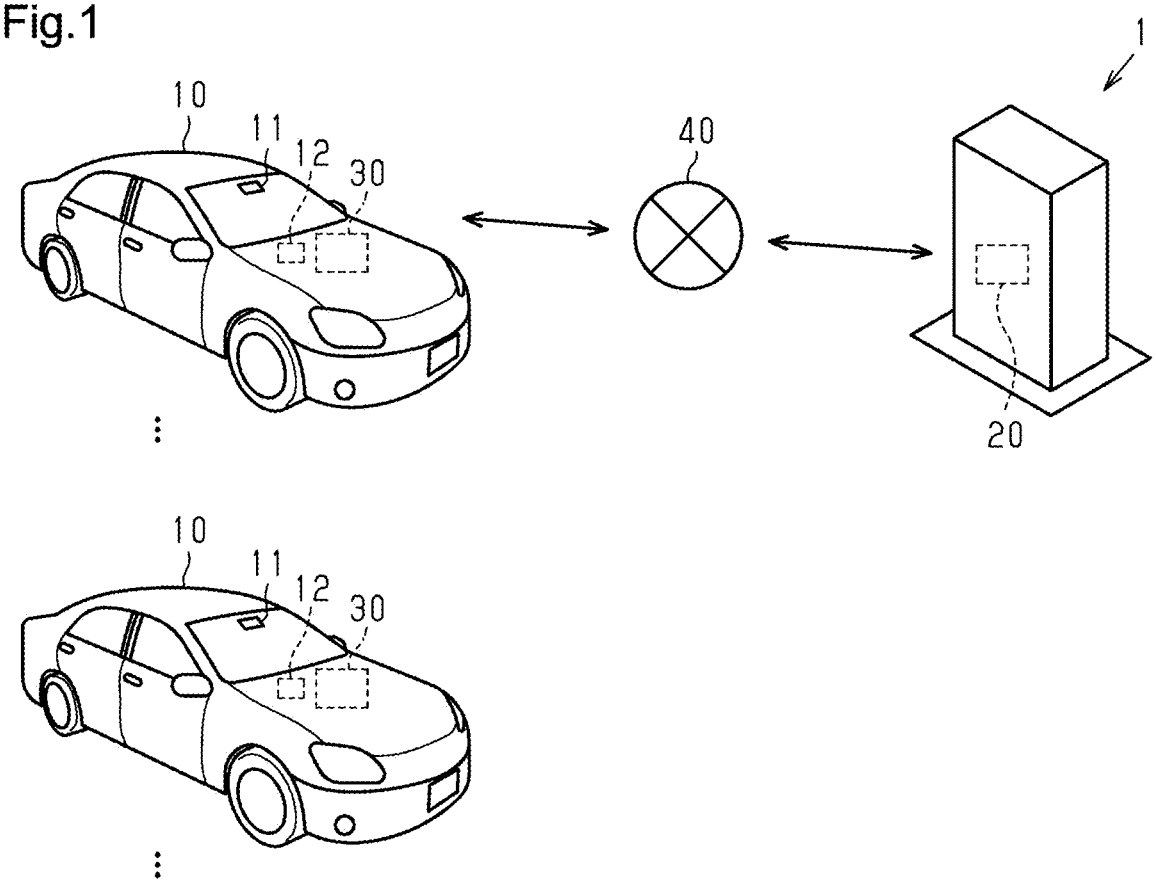
FIG. 1 is a diagram illustrating an information processing system.

As shown in FIG. 1, an information processing system 1 includes, for example, one or more vehicles 10 and one or more server devices 20. The server device 20 is an example of an information processing device. The vehicle 10 includes, for example, an image capturing unit 11, a position information acquisition unit 12, and a controller 30. The controller 30 is connected to the server device 20 via a communication network 40 in a manner allowing for exchange of information. The communication network 40 includes, for example, the Internet, a wide area network (WAN), a local area network (LAN), a provider terminal, a wireless communication network, a wireless radio station, a leased line, or the like.

The image capturing unit 11 is, for example, a digital camera that uses a solid-state imaging element such as a charge coupled device (CCD), a complementary metal oxide semiconductor (CMOS), or the like. An example of the image capturing unit 11 is a digital camera included in a driving recorder. The image capturing unit 11 captures an image of the periphery of the vehicle 10 on which the image capturing unit 11 is mounted. Depending on where the image capturing unit 11 is arranged on the vehicle 10, the image capturing unit 11 captures an image of the front, rear, or side of the vehicle 10. The image capturing unit 11 generates a peripheral image by capturing an image of the periphery of the vehicle 10. Further, the image capturing unit 11 generates a peripheral video formed by a plurality of peripheral images that are chronologically consecutive.

The position information acquisition unit 12 is, for example, a global navigation satellite system (GNSS) receiver. The position information acquisition unit 12 determines the position of the vehicle 10 from a signal received from a GNSS satellite and obtains position information indicating the position of the vehicle 10.

The controller 30 sends the position information to the server device 20 in predetermined time intervals so that the server device 20 identifies the position of the vehicle 10. Further, under a condition in which the controller 30 receives a request from the server device 20 and a peripheral image or a peripheral video matches a predetermined condition presented by the server device 20, the controller 30 sends the peripheral image or the peripheral video to the server device 20. Specifically, if the controller 30 can provide only a peripheral image due to the specification of the image capturing unit 11 or the specification of the driving recorder, the controller 30 sends a peripheral image that matches the predetermined condition to the server device 20. If the controller 30 can provide only a peripheral video due to the specification of the image capturing unit 11 or the specification of the driving recorder, the controller 30 sends a peripheral video that matches the predetermined condition to the server device 20. If the controller 30 can provide both a peripheral image and a peripheral video, the controller 30 provides only a peripheral video.

The server device 20 is, for example, a device that aggregates information provided by the vehicle 10. The server device 20 collects from the vehicle 10, for example, peripheral images that adequately show a weather-related event, such as a tornado or a falling of a meteorite, or a natural disaster event, such as an earthquake or a flood. In the description hereafter, when a weather-related event or a natural disaster event is not being distinguished, it is simply referred to as an "event".

Configuration of Server Device 20

Figure 2:
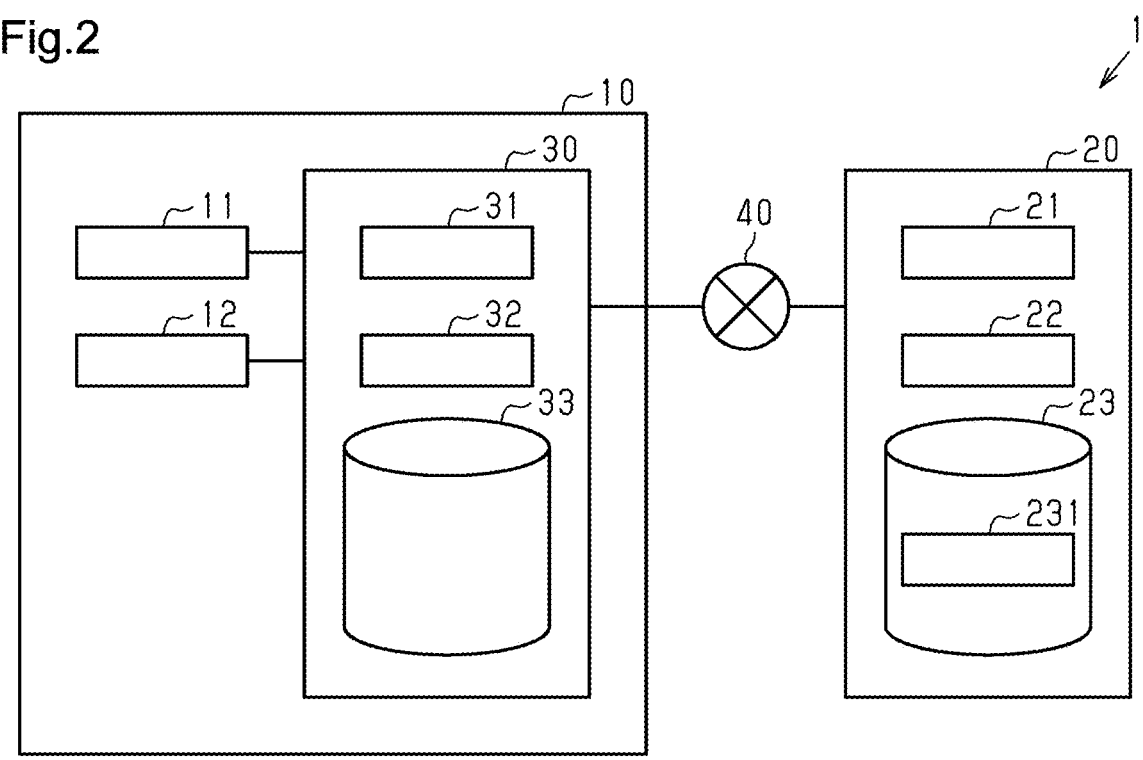
FIG. 2 is a diagram showing an example of the configuration of a server device and a controller.

As shown in FIG. 2, the server device 20 includes, for example, a processing circuit 21, a communication unit 22, and a storage unit 23. The processing circuit 21 includes, for example, a hardware processor such as a central processing unit (CPU).

The processing circuit 21 performs various types of processes when the hardware processor runs programs. The programs may be stored in the storage unit 23 in advance. The storage unit 23 includes, for example, a non-transitory storage medium such as a hard disk drive (HDD), a flash memory, or the like. The communication unit 22 includes, for example, a communication circuit or a communication module. The communication unit 22 sends and receives various types of data to and from the controller 30 or other devices in accordance with control executed by the processing circuit 21.

The storage unit 23 stores predetermined-condition information 231 in advance. The predetermined-condition information 231 is, for example, information in which an event is associated with a predetermined condition suitable for capturing an image of the event. The predetermined-condition information 231 includes first predetermined-condition information 231-1 and second predetermined-condition information 231-2.

As illustrated in FIG. 3, the first predetermined-condition information 231-1 includes, for example, information indicating predetermined conditions regarding an image capturing position, an image capturing direction, and a video quality in association with each of a weather-related event and a natural disaster event. The predetermined condition regarding the image capturing position relates to whether the position of the vehicle 10 is on a local road or a highway. The predetermined condition regarding the image capturing direction relates to whether the angle of view of the image capturing unit 11 is directed downward or upward with respect to the horizontal direction. The predetermined condition regarding the video quality includes a condition regarding the resolution of a peripheral image generated by the image capturing unit 11 and a condition regarding the frame rate of a peripheral video generated by the image capturing unit 11. The predetermined condition regarding the resolution relates to whether a peripheral image has a resolution that is lower than a predetermined resolution or higher than or equal to the predetermined resolution. The predetermined condition regarding the frame rate relates to whether a peripheral video has a frame rate that is lower than a predetermined frame rate or higher than or equal to the predetermined frame rate. The predetermined resolution is, for example, full high-definition. The predetermined frame rate is, for example, 60 fps. The provided predetermined resolution and the provided predetermined frame rate are merely examples, and are not limited to such configurations.

Specifically, the first predetermined-condition information 231-1 indicates the following predetermined conditions (A1) to (A5) in association with a weather-related event.

(A1) The image capturing position is on a highway, and if not available, on a local road. In other words, the highway is preferred over the local road.

(A2) As the image capturing direction, the angle of view is directed upward.

(A3) A peripheral video is provided.

(A4) The resolution is higher than or equal to the predetermined resolution, and if not available, lower than the predetermined resolution. In other words, a high resolution is preferred over a low resolution.

(A5) The frame rate is higher than or equal to the predetermined frame rate.

Further, the first predetermined-condition information 231-1 indicates the following predetermined conditions (B1) to (B5) in association with a natural disaster event.

(B1) The image capturing position is on a local road, and if not available, on a highway. In other words, the local road is preferred over the highway.

(B2) As the image capturing direction, the angle of view is directed downward.

(B3) A peripheral image is provided, and a peripheral video may be provided. In other words, the peripheral image is prioritized over the peripheral video.

(B4) The resolution is higher than or equal to the predetermined resolution, and if not available, lower than the predetermined resolution. In other words, a high resolution is preferred over a low resolution.

(B5) The frame rate is lower than the predetermined frame rate.

As illustrated in FIG. 4, the second predetermined-condition information 231-2 indicates, for example, conditions in association with a natural disaster event, particularly, an earthquake. Specifically, in the second predetermined-condition information 231-2, a predetermined condition (C1) is associated with an earthquake having a seismic intensity that is greater than or equal to a predetermined seismic intensity. In the second predetermined-condition information 231-2, a predetermined condition (C2) is associated with an earthquake having a seismic intensity that is less than the predetermined seismic intensity.

(C1) The video includes scenes during the earthquake or after the shaking caused by the earthquake has stopped.
(C2) The video includes scenes during the earthquake.

The predetermined conditions included in the predetermined-condition information 231 are merely examples and are not limited such configurations. Some of the predetermined conditions included in the predetermined-condition information 231 may be omitted. Further, the predetermined-condition information 231 may include other predetermined conditions.

Returning to FIG. 2, the server device 20 receives, for example, information indicating an occurrence of an event and the site of the event from a user or an administrator of the server device 20, or the like. The processing circuit 21 refers to the predetermined-condition information 231 and identifies an event that matches the event indicated in the input information. The processing circuit 21 determines information indicating the predetermined conditions associated with the identified event. More specifically, the server device 20 changes the predetermined conditions in accordance with the type of the event by selecting the predetermined conditions from the predetermined-condition information 231. In other words, the server device 20 determines the predetermined conditions in accordance with the event. The processing circuit 21 identifies the vehicle 10 located within a predetermined distance range from the site of the event based on the information indicating the site of the event and the position information received from the vehicle 10. The processing circuit 21 requests the vehicle 10 to send a peripheral image or a peripheral video by sending the information indicating the determined predetermined conditions from the communication unit 22 to the specified vehicle 10. The server device 20 collects the peripheral image or the peripheral video sent from the vehicle 10 in response to the request.

Configuration of Controller 30

As shown in FIG. 2, the controller 30 includes, for example, a processing circuit 31, a communication unit 32, and a storage unit 33. The processing circuit 31 includes, for example, a hardware processor such as a CPU. The processing circuit 31 performs various types of processes when the hardware processor runs programs. The programs may be stored in the storage unit 33 in advance. The storage unit 33 includes, for example, a non-transitory storage medium such as a hard disk drive (HDD), a flash memory, or the like.

The communication unit 32 includes, for example, a communication circuit or a communication module. The communication unit 32 sends and receives various types of data to and from the server device 20 and other devices in accordance with control executed by the processing circuit 31.

When the processing circuit 31 receives information indicating the predetermined conditions from the server device 20 by the communication unit 32, the processing circuit 31 determines whether a peripheral image or a peripheral video that is the subject of the determination satisfies the predetermined conditions. The subject peripheral image is, for example, a peripheral image generated by the image capturing unit 11 at a time point at which the processing circuit 31 received the information indicating the predetermined conditions. The subject peripheral video is, for example, a video of a period from a predetermined time before a time point at which the processing circuit 31 received the information indicating the predetermined conditions to the time point at which the processing circuit 31 received the information indicating the predetermined conditions.

The processing circuit 31 identifies the image capturing direction, the resolution, and the frame rate based on the specification and/or the parameter settings of the image capturing unit 11. Further, the processing circuit 31 identifies the angle of view based on the position of a vanishing point on the subject peripheral image or the position of a vanishing point on each peripheral image forming the subject peripheral video. Furthermore, the processing circuit 31 executes general image processing on the subject peripheral image or each peripheral image forming the subject peripheral video to identify whether the road shown in the peripheral image is a local road or a highway.

Consequently, the processing circuit 31 determines whether the subject peripheral image or the subject peripheral video satisfies the predetermined conditions using the various identified information. When the processing circuit 31 determines that the predetermined conditions are not satisfied, the processing circuit 31 does not provide the peripheral image or the peripheral video to the server device 20. When the processing circuit 31 determines that the predetermined conditions are satisfied, the processing circuit 31 provides the peripheral video or the peripheral video to the server device 20.

Series of Processes Executed by Controller 30

A process executed by the controller 30 will now be described with reference to FIG. 5. In addition to the process illustrated in FIG. 5, the processing circuit 31 executes a process for sending the position information indicating the position of the vehicle 10 from the communication unit 32 to the server device 20 in predetermined time intervals.

Figure 5:
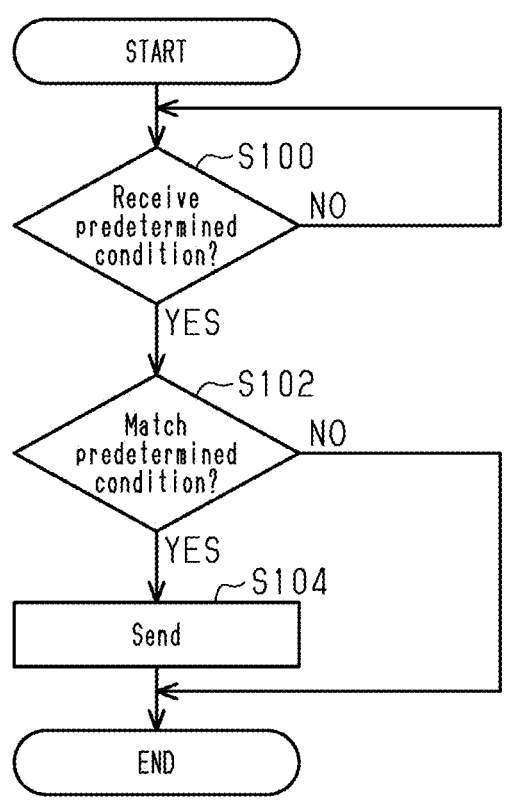
FIG. 5 is a flowchart illustrating an example of a process executed by the controller.

As illustrated in FIG. 5, first, the processing circuit 31 determines whether information indicating the predetermined conditions is received by the communication unit 32 from the server device 20 (step S100). The processing circuit 31 waits until the processing circuit 31 receives information indicating the predetermined conditions from the server device 20 (step S100; NO). When the processing circuit 31 receives information indicating the predetermined conditions, the processing circuit 31 determines whether a peripheral image or a peripheral video that is the subject of the determination satisfies the predetermined conditions (step S102). When the received predetermined conditions are the predetermined conditions (A1) to (A5) associated with a weather-related event or the predetermined conditions (C1) to (C2) associated with an earthquake, the processing circuit 31 determines whether a subject peripheral video satisfies the corresponding predetermined conditions. When the received predetermined conditions are the predetermined conditions (B1) to (B5) related to a natural disaster event other than an earthquake, the processing circuit 31 determines whether a subject peripheral video satisfies the corresponding predetermined conditions.

When the processing circuit 31 determines that the predetermined conditions are not satisfied (step S102; NO), the processing circuit 31 determines that there is no peripheral image or no peripheral video to be provided to the server device 20, and ends processing. When the processing circuit 31 determines that the predetermined conditions are satisfied (step S102; YES), the processing circuit 31 sends the subject peripheral image or the subject peripheral video from the communication unit 22 to the server device 20 (step S104). Then, the processing circuit 31 ends processing.

Series of Processes Executed by Server Device 20

Figure 6:
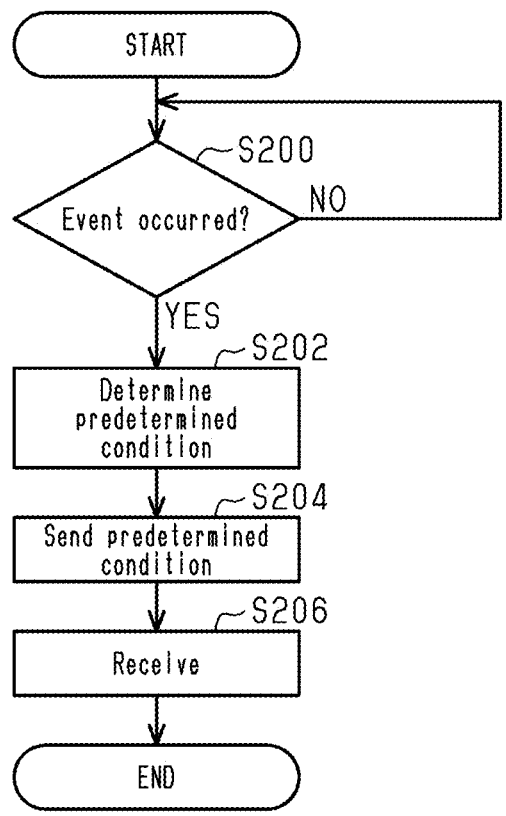
FIG. 6 is a flowchart illustrating an example of a process executed by the server device.

A process executed by the server device 20 will now be described with reference to FIG. 6. In addition to the process illustrated in FIG. 6, the processing circuit 21 executes a process for receiving the position information indicating the position of the vehicle 10 from the controller 30 by the communication unit 22 in predetermined time intervals.

As illustrated in FIG. 5, first, the processing circuit 21 determines whether an event has occurred (step S200). The processing circuit 21 waits until an event occurs (step S200; NO). When the processing circuit 21 receives information indicating an occurrence of an event and the site of the event, the processing circuit 21 determines that an event has occurred. When the processing circuit 21 determines that an event has occurred (step S200; YES), the processing circuit 21 refers to the predetermined-condition information 231 and determines the predetermined conditions associated with the event (step S202). The processing circuit 21 sends information indicating the determined predetermined conditions from the communication unit 22 to the vehicles 10 located within a predetermined distant range from the site of the event (step S204). The processing circuit 21 receives a peripheral image or a peripheral video that matches the predetermined conditions from the vehicle 10 by the communication unit 22 (step S206). Then, the processing circuit 21 ends processing.

Operation and Advantages of Embodiment

The above embodiment has the following operation and advantages.
(1) The image capturing unit 11 generates a peripheral image by capturing an image of the periphery of the vehicle 10. The position information acquisition unit 12 obtains the position information of the vehicle 10 and sends the obtained position information to the server device 20.

The processing circuit 21 determines information indicating the predetermined conditions associated with the occurred event. The processing circuit 21 requests the vehicle 10 to send a peripheral image by sending the information indicating the determined predetermined conditions of the peripheral image from the communication unit 22 to the vehicle 10. Alternatively, the processing circuit 21 requests the vehicle 10 to send a peripheral video by sending the information indicating the determined predetermined conditions of the peripheral video from the communication unit 22 to the vehicle 10. Then, the controller 30 of the vehicle 10 searches for a peripheral image generated when the event occurred. The controller 30 determines whether the peripheral image satisfies the predetermined conditions. When the controller 30 determines that the peripheral image satisfies the predetermined conditions, the controller 30 sends the peripheral image to the server device 20. When the controller 30 determines that the peripheral image does not satisfy the predetermined conditions, the controller 30 does not send the peripheral image to the server device 20.

The server device 20 collects the peripheral images and the peripheral videos sent from the vehicles 10 in response to the request. Such a configuration allows the server device 20 to collect peripheral images and peripheral videos that adequately captured certain events. Specifically, the server device 20 does not have to collect images that do not satisfy the predetermined conditions.

(2) The predetermined conditions include at least one of the position of the vehicle 10 and the image capturing direction of the peripheral image.

In order to adequately capture a weather-related event such as a tornado or a falling of a meteorite in a peripheral video, it may be preferred that the vehicle 10 be located on a highway where the visibility is better than on a local road. Accordingly, the first predetermined-condition information 231-1 associated with a weather-related event includes the predetermined condition (A1). This allows the server device 20 to collect a peripheral video generated when the vehicle 10 is on a highway with good visibility.

In order to adequately capture a weather-related event in a peripheral image, it may be preferred that the angle of view corresponding to the peripheral image be directed upward. Accordingly, the first predetermined-condition information 231-1 associated with a weather-related event includes the predetermined condition (A2). This allows the server device 20 to collect a peripheral image or a peripheral video in which the angle of view is directed upward and the sky is sufficiently captured.

In order to adequately capture a natural disaster event such as an earthquake or a flood in a peripheral image or a peripheral video, it may be preferred that the image or the video allow a crack in the ground, the flow of water, or the like to be recognizable. Thus, it may be preferred that the vehicle 10 be located on a local road that is closer to the ground surface than a highway. Accordingly, the first predetermined-condition information 231-1 associated with a natural disaster event includes the predetermined condition (B1). This allows the server device 20 to collect a peripheral image or a peripheral video generated when the vehicle 10 is on a local road where the condition of the ground surface is better recognizable.

In order to adequately capture a natural disaster event in a peripheral image, it may be preferred that the angle of view corresponding to a peripheral image be directed downward. Accordingly, the first predetermined-condition information 231-1 associated with a natural disaster event includes the predetermined condition (B2). This allows the server device 20 to collect a peripheral image or a peripheral video in which the angle of view is directed downward and the ground surface is sufficiently captured.

(3) The predetermined condition includes the frame rate related to a peripheral video. In order to adequately capture a weather-related event such as a tornado or a falling of a meteorite, which occurs in a short period of time, in a peripheral video, it may be preferred that the image capturing unit 11 capture the video at a relatively high frame rate. Accordingly, the first predetermined-condition information 231-1 associated with a weather-related event includes the predetermined condition (A5). This allows the server device 20 to collect a peripheral image or a peripheral video captured at a frame rate that is in accordance with the event.

(4) As illustrated in the second predetermined-condition information 231-2, when the seismic intensity of an earthquake is greater than or equal to a predetermined seismic intensity, the predetermined condition includes that a peripheral video includes both a peripheral image generated during the earthquake and a peripheral image generated after the shaking caused by the earthquake has stopped. When the seismic intensity of an earthquake is less than the predetermined seismic intensity, the predetermined condition includes that a video includes only a peripheral image generated during the earthquake, instead of a peripheral image generated during the earthquake and a peripheral image generated after the shaking caused by the earthquake has stopped.

When the seismic intensity of an earthquake is greater than or equal to the predetermined seismic intensity, it may be preferred that the video capture the scene during the earthquake and the situation around the vehicle 10 after the shaking caused by the earthquake has stopped. This is because when the seismic intensity is relatively large, the possibility of damages resulting from the earthquake is high. On the other hand, when the seismic intensity of the earthquake is less than the predetermined seismic intensity, it may be preferred that the video show the degree of shaking during the earthquake. This is because when the seismic intensity is relatively small, the possibility of damages resulting from the earthquake is low. Accordingly, the predetermined conditions are changed depending on whether the seismic intensity is greater than or equal to the predetermined seismic intensity. This allows the server device 20 to collect a peripheral video that adequately captures an earthquake in accordance with the seismic intensity of the earthquake.

Modifications

The above embodiment may be modified as follows. The above embodiment and the following modifications can be combined as long as the combined modifications remain technically consistent with each other.

The predetermined-condition information 231 may include a condition related to the length of a peripheral video. The predetermined-condition information 231 may include, for example, a condition that a peripheral video is a predetermined length or longer. Such a configuration allows the server device 20 to obtain a peripheral video that is long enough to document the event.

In the above description, in the first predetermined-condition information 231-1, the same predetermined condition regarding the frame rate is associated with a weather-related event. However, there is no limit to such a configuration. A falling of a meteorite occurs in a shorter period of time than a tornado. Accordingly, with respect to a weather-related event, an occurrence of a tornado may be associated with a predetermined condition that the frame rate is lower than the frame rate associated with a falling of a meteorite. Alternatively, with respect to a weather-related event, a falling of a meteorite may be associated with a predetermined condition that the frame rate is higher than the frame rate associated with an occurrence of a tornado.

In the above description, when the controller 30 can provide both a peripheral image and a peripheral video, the controller 30 only provides the peripheral video. However, there is no limit to such a configuration. When the controller 30 can provide both a peripheral image and a peripheral video, the controller 30 may send both the peripheral image and the peripheral video to the server device 20 as long as the predetermined conditions are satisfied. Alternatively, the controller 30 may send an appropriate one of the peripheral image and the peripheral video to the server device 20 in accordance with the event and the predetermined conditions.

In the above description, a peripheral image that is the subject of determination is, for example, a peripheral image generated by the image capturing unit 11 at a time point at which information indicating the predetermined conditions is received. However, there is no limit to such a configuration. The server device 20 may send, for example, information indicating the date and time when the event occurred to the controller 30 together with information indicating the predetermined conditions. In this case, the processing circuit 31 uses a peripheral image, which is captured and generated by the image capturing unit 11 at the date and time when the event indicated in the received information has occurred, as the subject peripheral image in the subsequent processing. Alternatively, the processing circuit 31 uses a peripheral video, which includes a peripheral image captured and generated by the image capturing unit 11 at the date and time when the event indicated in the received information has occurred, as the subject peripheral video in the subsequent processing.

Some or all of the elements of the processing circuit 21 and the processing circuit 31 may be implemented by hardware such as a large scale integration (LSI), an application specific integrated circuit (ASIC), a field-programmable gate array (FPGA), or a graphics processing unit (GPU), or may be implemented by cooperation of software and hardware.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An information processing device, comprising:
a processor, wherein:
in response to an occurrence of at least one of a weather-related event and a natural disaster event, the processor is configured to identify a vehicle located at a site of the event;
the processor is configured to determine a predetermined condition in accordance with the event;
the processor is configured to request the identified vehicle to provide a peripheral image that satisfies the predetermined condition, the peripheral image being generated when an image capturing unit mounted on the identified vehicle captures an image of a periphery of the identified vehicle; and
the processor is configured to receive the requested peripheral image from the identified vehicle via a communication network, wherein:
the peripheral image is one of peripheral images that are chronologically consecutive;
when the event occurs, the processor is further configured to request the vehicle located at the site of the event to provide a peripheral video that satisfies the predetermined condition, the peripheral video being formed by the peripheral images; and
the predetermined condition includes a frame rate related to the peripheral video, wherein
the weather-related event includes an occurrence of a tornado and a falling of a meteorite, and
the frame rate associated with an occurrence of a tornado is lower than the frame rate associated with a falling of a meteorite.

2. The information processing device according to claim 1, wherein:

the predetermined condition includes at least one of a length of the peripheral video, a position of the vehicle, and an image capturing direction of the peripheral images.

3. An information processing device, comprising:
a processor, wherein:
in response to an occurrence of at least one of a weather-related event and a natural disaster event, the processor is configured to identify a vehicle located at a site of the event;
the processor is configured to determine a predetermined condition in accordance with the event;
the processor is configured to request the identified vehicle to provide a peripheral image that satisfies the predetermined condition, the peripheral image being generated when an image capturing unit mounted on the identified vehicle captures an image of a periphery of the identified vehicle; and
the processor is configured to receive the requested peripheral image from the identified vehicle via a communication network wherein:
the peripheral image is one of peripheral images that are chronologically consecutive;
when the event occurs, the processor is further configured to request the vehicle located at the site of the event to provide a peripheral video that satisfies the predetermined condition, the peripheral video being formed by the peripheral images;
the natural disaster event includes an occurrence of an earthquake;
when a seismic intensity of the earthquake is greater than or equal to a predetermined seismic intensity, the predetermined condition includes that the peripheral video includes both the peripheral image generated during the earthquake, and the peripheral image generated after a shaking caused by the earthquake has stopped; and
when the seismic intensity of the earthquake is less than the predetermined seismic intensity, the predetermined condition includes that the peripheral video includes the peripheral image generated during the earthquake but does not include the peripheral image generated after the shaking caused by the earthquake has stopped.

* * * * *